United States Patent [19]

Rebman

[11] 4,327,496
[45] May 4, 1982

[54] ADJUSTABLE LINK-TYPE INSERTION COMPLIANCE DEVICE

[75] Inventor: Jack Rebman, Erie, Pa.

[73] Assignee: Lord Corporation, Erie, Pa.

[21] Appl. No.: 200,688

[22] Filed: Oct. 27, 1980

[51] Int. Cl.³ .............................................. G01B 5/25
[52] U.S. Cl. .............................. 33/180 R; 33/169 C;
33/172 D; 33/185 R
[58] Field of Search ............. 33/180 R, 185 R, 169 C,
33/172 D, 181 R

[56] References Cited

U.S. PATENT DOCUMENTS

| | | | |
|---|---|---|---|
| 2,911,727 | 11/1959 | Steinhart | 33/172 D |
| 4,098,001 | 7/1978 | Watson | 33/169 |
| 4,155,169 | 5/1979 | Drake et al. | 33/169 |
| 4,202,107 | 5/1980 | Watson | 33/185 R |
| 4,290,203 | 9/1981 | Rebman | 33/185 R |

FOREIGN PATENT DOCUMENTS

466002  9/1928  Fed. Rep. of Germany .... 33/169 C

*Primary Examiner*—Willis Little
*Attorney, Agent, or Firm*—Thomas L. Kautz

[57] ABSTRACT

A link-type insertion compliance device is provided to accommodate misalignment between mating parts to be assembled in which a series of aligning links attached to pivot means are concentrically disposed within an envelope mounted to a machine operable to vertically translate one mating part into engagement with another in an assembly operation. Adjustment means is provided in at least one of the pivot means to permit adjustment of the center of compliance of the device to a point at or near the insertion end of a part to be assembled. Parts of varying lengths may thus be accommodated by the subject insertion compliance device with minimal wedging and jamming during the insertion operation.

16 Claims, 7 Drawing Figures

ADJUSTABLE LINK-TYPE INSERTION COMPLIANCE DEVICE

FIELD OF THE INVENTION

This invention relates to the mechanical assembly of component parts, and, more particularly, to a link-type insertion compliance device for the assembly of mating parts which are slightly misaligned.

BACKGROUND OF THE INVENTION

The number of man hours devoted to assembly seldom occupies less than 10% of the labor force in any industry and may require more than one third of the total work force in some instances. In an effort to improve manufacturing productivity, increasingly concentrated efforts have been undertaken to design automated devices capable of assembling mating parts or components in applications such as inserting a pin or bolt into an orifice, shafts into bearings, bearings into bores and similar operations. Advanced automated assembly devices or robots may be programmable, and have been utilized to assemble more complicated items such as alternators for vehicle engines and similar "stack" products where all component parts can be added from a single direction. Many of the devices developed to date share the advantages of requiring no separate energy sources, no people, and no sensors or servos for operation.

Regardless of the sophistication of assembly machinery, difficulties have been encountered in accommodating misalignment between mating parts particularly for small clearance fits of low aspect ratio using machine or tooled assembly methods. In any system which does not use manual tactile feed-back (feel) and manual manipulation, such insertion is a problem. Whether resulting from the design of the mating parts, through normal process variations or by unavoidable error, misalignment between mating parts can create wedging, jamming and damage to the parts during the assembly operation. In addition, the mechanisms which deliver either one or both of the mating parts to a position for assembly may not provide precise registration of such parts relative to each other which could create further misalignment. Thus, robots, manipulators, and other automated assembly devices which do not depend on skillful manual manipulation techniques, must include means to accommodate misalignment between mating parts to avoid jamming or wedging and reduce excess insertion loads.

U.S. Pat. Nos. 4,098,001 to Watson and 4,155,169 to Drake et al are examples of prior art insertion compliance systems designed to accommodate misalignment between mating parts during assembly without manual manipulation and without excess insertion loading. The devices described in both of these patents are directed to the problem of inserting a pin into a bore. Translational flexible elements and rotational flexible elements having specific compliances are positioned in a particular geometrical relationship to project a center of compliance or elastic center at or near the end of the pin to be inserted within the bore. To achieve optimal performance, the systems of Watson and Drake et al require relatively precise positioning of the flexible elements and control of the magnitude of their compliance characteristics, particularly the rotational flexible elements, to accurately project the center of compliance to the desired location along the pin. Such design criteria increases the expense of the devices both in terms of material and fabrication costs. In addition, since the position of the flexible elements and their compliance characteristics are fixed, the location of the center of compliance is also fixed. This means that in order to obtain an optimal level of effectiveness in an assembly operation, the position of the insertion end of each part to be assembled must be the same. Therefore, the utility of such devices is significantly limited in assembly operations where the automated equipment is required to assemble a variety of parts having different length dimensions.

SUMMARY OF THE INVENTION

The subject invention provides an insertion compliance device consisting of a series of link elements disposed along the longitudinal axis of the device which are pivotally interconnected at selected locations. One or more of the pivot connections is capable of permitting vertical movement of one link relative to the other to vary the distance between adjacent pivot points. As discussed below, an adjustment of the relative locations between pivot points results in a corresponding variation in the location of the center of compliance of the insertion device herein. The optimum condition of projecting the center of compliance at or near the lead end of the object to be inserted is thus easily obtained for a wide variety of parts having different length dimensions.

The insertion device of the subject invention need not be fabricated with a high degree of manufacturing precision in contrast to the prior art devices described above. In addition, the present invention may be formed as a long, slender envelope which lends itself to the spindle-like configurations of most tooling.

Therefore it is an object of the present invention to provide an insertion device capable of varying the location of its center of compliance with a simple adjustment.

It is another object herein to provide an insertion device consisting of link elements pivotally interconnected at selected locations, wherein at least one of the pivot connections is moveable to vary the vertical distance between adjacent pivot points which in turn varies the location of the center of compliance of the device.

It is a further object of the subject invention to provide an insertion device which may be fabricated without a high degree of manufacturing precision in a compact configuration capable of being retrofitted at minimal expense in a variety of applications.

DESCRIPTION OF THE DRAWINGS

Objects in addition to the foregoing will become apparent upon consideration of the following description taken in conjunction with the accompanying drawings wherein.

DETAILED DESCRIPTION OF THE INVENTION

Figure 1:
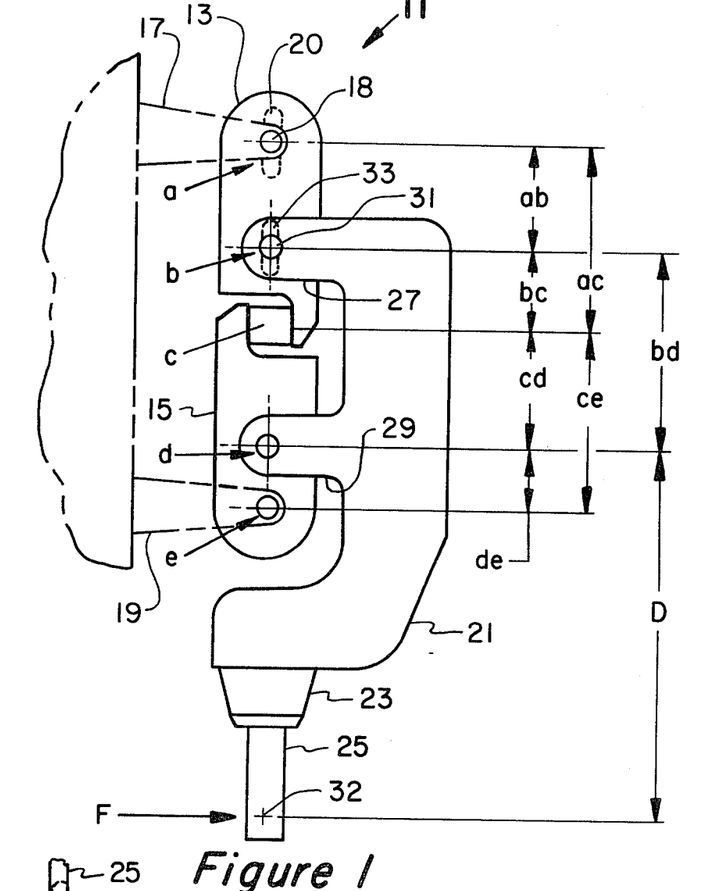
FIG. 1 is a front view of one embodiment of the insertion compliance device herein having two degrees of freedom of movement in a single plane.
Figures 2, 3:
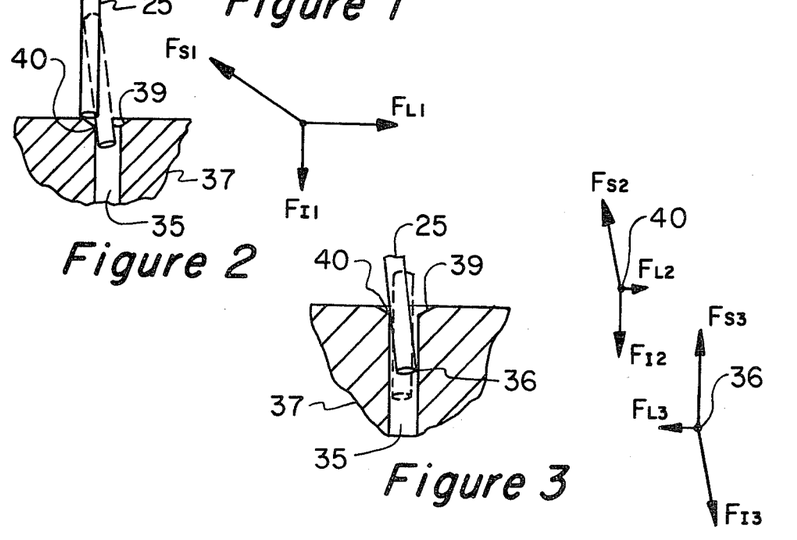
FIG. 2 is a partial front view of the initial stage of insertion of a pin into the bore of a mating part, including the resulting free body force diagram.
FIG. 3 is a partial front view of an advanced stage of insertion of a pin into the bore of a mating part, including the resulting free body force diagram.

Referring now to the drawings and in particular to FIGS. 1-3, one embodiment of the link-type insertion compliance device of the subject invention is labeled generally with a reference 11. Insertion device 11 includes a pair of link elements 13 and 15 disposed one above the other along a common axis. Link 13 is mounted to an upper support 17 at a pivot a, formed with a pin 18 moveable in a slot 20, about which link 13 can freely rotate and slide vertically therealong. Link 15 is pivotally mounted to a pivot e which attaches to a lower support 19. Upper and lower supports 17 and 19 form part of a machine frame (not shown) which is operable to reciprocate insertion device 11 toward and away from the bore 35 of mating part 37 (See FIG. 2). The ends of links 13 and 15 opposite points a and e respectively are joined together by a concentrated compliance labelled generally as c in FIG. 1. Compliance c may be formed of a variety of spring elements but in the preferred embodiment herein an elastomeric sandwich consisting of alternating layers of rigid material and elastomer bonded together is utilized.

Insertion device 11 further includes a bracket 21 having a chuck 23 capable of receiving the pin 25 for insertion into the bore 35 of mating part 37. Bracket 21 is formed with an upper arm 27 pivotally attached to link 13 at pivot b, and a lower arm 29 pivotally attached to link 15 at pivot d. Pivot b includes a pin 31 attached to upper arm 27 which is vertically moveable within an elongated slot 33 formed in link 13 to vary the relative distances between upper arm 27, pivot a and compliance c for purposes to become apparent below.

As is well known, the elastic center or center of compliance may be defined as a point at which the application of a pure force will produce a pure translation, and the application of a pure moment will produce a pure rotation about such point. In the context of an insertion operation, discussed more fully below, the pin or other part to be inserted within a bore or other cavity of a mating part is subjected to lateral forces, moments, and vertical forces. The magnitude of such forces will be dependent upon several factors; for example, the vertical forces in a press fit will be larger than the vertical forces for a slip fit and the lateral forces and moments will depend on the degree of lateral and angular misalignment encountered between the mating parts. As discussed in the prior art cited above, minimal insertion forces are obtained by projecting the elastic center or center of compliance at or near the lead end of the part to be inserted. The application of lateral forces, moments and vertical forces to the pin during the insertion operation will thus produce pure translation and pure rotation at the lead end of the pin to minimize insertion loads.

The primary limitation of prior art devices, as mentioned above, is that they are of fixed geometry and fixed compliance characteristics. The center of compliance is projected to a point at or near the insertion end of a part having a given length such that the insertion operation may be accomplished with minimal wedging, jamming or damage to the part. Such devices are thus inappropriate for use in assembly operations wherein parts of various lengths are to be assembled. In addition, the physical size of prior art devices generally limits retro-fitting to existing automated machinery without costly alterations. The subject invention solves this problem by providing a compact insertion device having means to adjust the location of its center of compliance to accommodate parts of varying length.

An examination of the kinematics of insertion device 11 will reveal its adjustability and operation. It should be noted that the distances indicated on FIG. 1 represent the spacing between pivots a, b, d, e and compliance c in the at rest or unstressed condition. As discussed above, links 13 and 15 are pivotally attached to supports 17 and 19 by pivots a and e respectively, which in turn attach to the machine foundation (not shown). The movement of bracket 21 is thus dependent upon the rotation and translation of links 13 and 15 in response to the application of forces and moments to pin 25. Assuming compliance c is moved arbitrarily to the right, link 13 rotates about pivot a and link 15 rotates about pivot e. Since compliance c is common to both links 13 and 15 they will travel the same distance to the right at that point, assuming no forces are applied to bracket 21. In response to the same force applied at compliance c, the pivots b and d will also move to the right over a lesser distance. The relative magnitude of the motions of pivots b and d will depend upon the relationship of the dimensions ab, bc, cd and de. If the length of link 13 is equal to the length of link 15, the movement of pivots b and d will be equal where dimensions ab and de are equivalent. If ab is not equal to de, the ratio of the movement at pivot b compared to the movement at pivot d depends upon the ratios ab/ac and de/ce. Thus, the translation and rotation of bracket 21, and in turn, pin 25, is a direct result of the relative motions of pivots b and d.

Considering the geometry of insertion device 11 as shown in FIG. 1, the center of compliance 32 is located a distance D from the pivot d on link 15. The distance D may be determined using the following relationship:

$$D = \frac{bd}{\left(\frac{N}{M} - 1\right)} \quad (1)$$

Where: $M = \frac{ac}{ab}$ $N = \frac{ce}{de}$

If the links 13 and 15 are equal in length, ac=ce, the expression reduces to:

$$D = \frac{bd}{\frac{ab}{de} - 1} \quad (2)$$

It can be appreciated by an examination of the equations (1) and (2) above that the position of the center of compliance 32 may be varied by changing the distances between pivots a, b, d or e. For purposes of illustration, pivot b is shown in FIG. 1 with an elongated slot 33 along which a pin 31 is moveable upwardly and downwardly to vary the distance ab in equation (2). It should be understood however that other means of adjustability could be incorporated into insertion device 11 to vary the distances ac, ab, ce or de, and the slotted pivot b is used for purposes of illustration.

Referring to equation (2) and starting with (ac)/(ab)=(ce)/(de), it is apparent that by moving pin 31 downwardly along slot 33 and thus increasing the dimension ab, the location of center of compliance 32 will move a proportional distance upwardly relative to bracket 21 and pivoted. Movement of pin 31 upwardly along slot 33, which decreases the dimension ab, causes the center of compliance 32 to be located a greater distance D from pivot d for accommodating a pin 25 of greater length than that shown in FIG. 1, as long as ab is greater than de. Once the dimension ab is adjusted to locate the center of compliance 32 at or near the insertion end of a part of given length, pin 31 is secured vertically within slot 33 (while being free to rotate therewithin) in preparation for an insertion operation as discussed below. Considering the particular geometry of the insertion device 11 shown in FIG. 1, projection of a center of compliance 32 to a point remote from bracket 21 will occur where the dimension ab is greater than de, with ac=ce. Therefore, a simple adjustment of the location of pivot b along link 13, and, correspondingly, pin 31 within slot 33, provides a corresponding change in the location of the center of compliance 32 to a point at or near the lead end of a pin 25 or other parts having varying length dimensions.

Referring now to FIGS. 2 and 3, the operation of insertion device 11 will be considered in connection with the problem of inserting pin 25 into the bore 35 of a mating part 37. For purposes of discussion, mating part 37 is both laterally and angularly misaligned with the longitudinal axis of pin 25. It should be understood, however, that the insertion device 11 herein is also capable of correcting only lateral or angular misalignment between pin 25 and the bore 35 of mating part 37. To begin the insertion operation, the assembly machine (not shown) moves downwardly to place pin 25 into contact with the chamfer 39 of bore 35. This represents the initial single-point-contact stage of what may be described as a two-stage reaction of insertion device 11 to accomplish a complete insertion operation. As shown in the free body force diagram in FIG. 2, the insertion forces acting on pin 25 during the single-point-contact stage of the insertion operation include a vertical component ($FI_1$), a lateral component ($FL_1$) and a frictional component ($FS_1$) acting parallel to the surface of chamber 39 which resists movement of the pin 25 therealong. By locating the center of compliance 32 at the insertion end of pin 25, the lateral force component $FL_1$ acting on the end of pin 25 produces a pure translation causing bracket 21 and pin 25 to move laterally to the right. As a result, pivots b and d both move an equal distance to the right. Since the dimension ab is greater than de and the dimensions ac and ce are equal, link 13 rotates in a counterclockwise direction through a smaller angle than the rotation of link 15 in a clockwise direction. Such differing magnitudes of angular rotation causes the point of connection of link 15 to compliance c to move laterally to the right a greater distance than the corresponding point of connection of link 14 to compliance c. This produces a compression deflection and load across compliance c. The compliance c thus allows differing lateral movements of the ends of link 13 and 15 connected thereto, which in turn permits pin 25 to translate laterally to the right and enter bore 35 of mating part 37.

As insertion proceeds, the end of pin 25 slips past the lower edge 40 of chamfer 39 and continues at the initial misalignment angle toward a point 36 on the opposite side wall bore 35. Pin 25 maintains contact with the edge 40 of chamfer 39 during this portion of the insertion operation with the only force opposing insertion being the friction load between pin 25 and the edge 40 of chamfer 39. Insertion progresses with a constant friction load until pin 25 contacts point 36 on the opposite side wall of bore 35. At this point in the insertion operation, pin 25 contacts bore 35 in two places; one being the edge 40 of chamfer 39 and the other being point 36 on the opposite side wall of bore 35. This initiates the second phase of the insertion reaction which may be identified as the two-point-contact stage.

Further advancement of pin 25 into bore 35 produces the forces shown in FIG. 3. The normal loads $FL_2$ and $FL_3$, acting at points 40 and 36 respectively, force pin 25 to rotate in a clockwise direct about a point between the two points of contact. Since bracket 21 is connected to pin 25 and is rigid, it will rotate in a clockwise direction about a point near the end of pin 25. As a result, pivot b deflects laterally to the right over a greater distance than pivot d, with the relative magnitude to such deflections being proportional to the respective distances of pivots b and d from the center of rotation. The deflections of pivots b and d in the two-point-contact stage of insertion, coupled with the attendant charges in the compressive forces acting on compliance c, are added to the deflections generated at pivots b and d and compliance c during the initial one-point-contact stage of the insertion operation to permit movement of bracket 21 so that the insertion of pin 25 within bore 35 of mating part 37 can be completed.

The vertical forces acting on insertion device 11, which are primarily components of the frictional forces applied to pin 25, place link 15 in tension since lower arm 29 of bracket 21 is disposed vertically above the fixed pivot e of link 15. Since pivots a and b of link 13 are in effect slip joints, they will react lateral loads but not tensile loads. The magnitude of vertical loads imposed on link 15 will be dependent on the type of fit for which insertion device 11 is to be utilized. For example, vertical forces associated with a press fit would be much higher than those imposed for slip fit applications and the tensile strength of link 15 may be specified accordingly.

As is apparent from viewing FIG. 1, insertion device 11 is capable of translating only in the plane of the page on which FIG. 1 is drawn, since pivots a, b, d, and e are not spherical in configuration. Thus, relatively precise alignment of pin 25 with the bore 35 of mating part 37 would be required in the plane of the page on which FIG. 1 is drawn for insertion device 11 to successfully operate. This limitation is overcome in the embodiments of the subject invention shown in FIGS. 4–7 in which pivots a, b, d, and e are formed as spherical bearings having various configurations to permit pin 25 to translate laterally in any plane perpendicular to the longitudinal axis of the devices.

Figure 4:
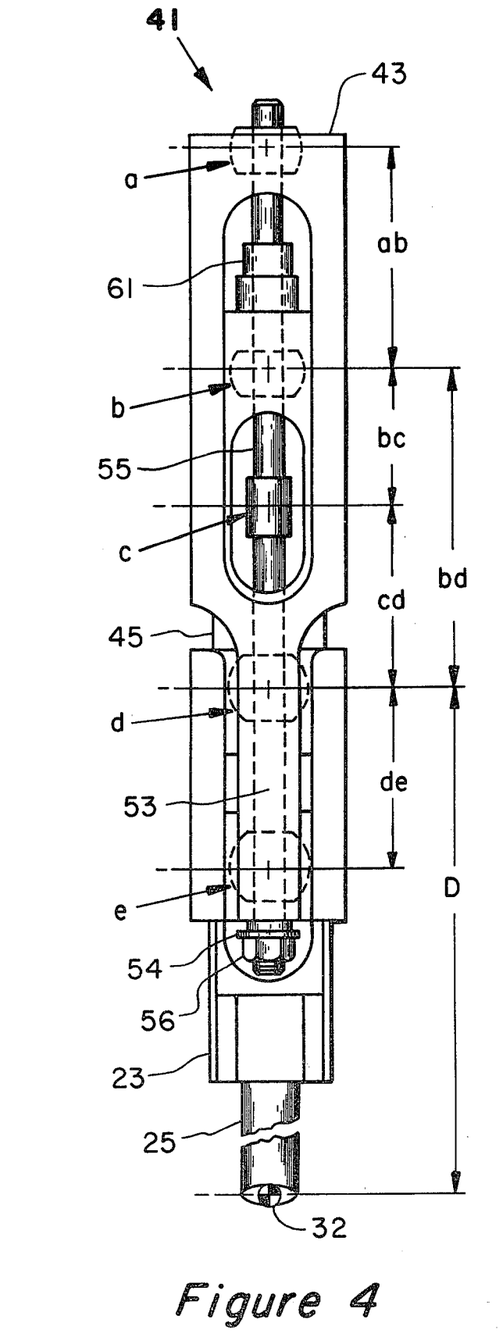
FIG. 4 is a partial front view of an alternate embodiment of the subject invention having spherical bearing means.
Figure 5:
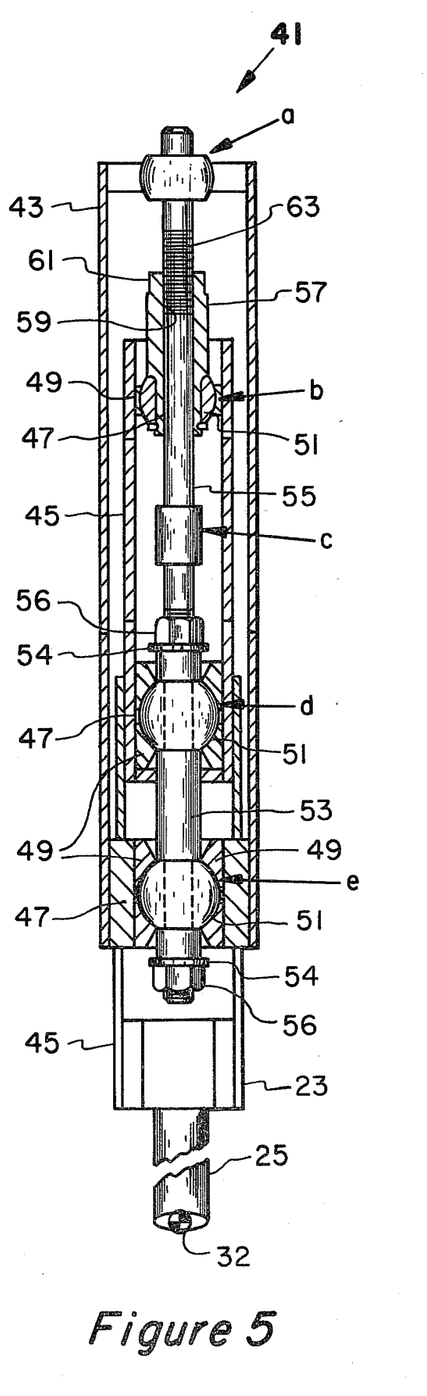
FIG. 5 is a front view in partial cross section of the device shown in FIG. 4.

Referring now to FIGS. 4 and 5, an insertion compliance device in which spherical bearings are utilized is labelled generally with the reference 41. The spherical bearings of insertion device 41 labelled a, b, d and e correspond directly to pivots a, b, d and e of FIG. 1. In addition, the location of center of compliance 32 is determined using the same relationship between the distances which separate pivots a, b, d, e and compliance c as discussed above in connection with FIG. 1.

Insertion device 41 includes a generally cylindrical-shaped sleeve forming part of the machine foundation 43 which extends virtually along the entire length of insertion device 41. A cylindrical sleeve 45, corresponding to bracket 21 of FIG. 1, is concentrically disposed within machine foundation 43 and extends from the upper end thereof to a position below its bottom edge. Sleeve 45 increases in diameter adjacent to pivot d and continues downwardly below the base of machine foundation 43 where a chuck 23 is attached for holding pin 25 during the insertion operation.

Each of the spherical pivots a, b, d and e includes a collar 47, bearing seats 49 and a bearing ball 51. The collar 47 of pivot e is mounted to the bottom portion of machine foundation 43, and receives bearing seats 49 in which bearing ball 51 is slideably disposed. Pivot d is mounted in a similar fashion to the base portion of sleeve 45. A link element 53, corresponding to link 15 of FIG. 1, is disposed between and attaches to pivots d and e by means of a washer 54 and nut 56, and extends upwardly to its attachment to compliance c as in FIG. 1. A second link element 55, corresponding to link 13 of FIG. 1, is secured at its lower end to compliance c and continues upwardly to pivot b and then to pivot a which is mounted to the upper end of machine foundation 43.

Second link element 55 includes means to adjust the location of the center of compliance 32 of insertion device 41. The bearing seats 49 of pivot b slideably engage the inner walls of sleeve 45 adjacent its upper end. Bearing ball 51 of pivot b includes a cylindrical adjustment extension 57 which extends upwardly from pivot b concentric with and along the exterior surface of second link element 55. The adjustment extension 57 is formed with interior threads 59 and exterior wrench flats 61 on the upper end thereof. The interior threads 59 of adjustment extension 57 engage with a threaded section 63 formed along a portion of second link element 55.

Adjustment of the center of compliance 32 of insertion device 41 is accomplished by using the wrench flats 61 to rotate adjustment extension 57, which, in turn, moves pivot b upwardly and downwardly along the threaded section 63 of second link element 55. By rotating adjustment extension 57 in the counterclockwise direction, pivot b slides downwardly along the inner walls of sleeve 45 thus increasing the distance between pivot b and pivot a. As discussed above, an increase in the distance ab between pivot b and pivot a causes the center of compliance 32 to move upwardly relative to insertion device 41, if ac=ce and the dimension ab is greater than de. Upward sliding movement of pivot b along sleeve 45, caused by rotating adjustment extension 57 in the clockwise direction, moves the center of compliance 32 of insertion device 41 downwardly from the location shown in FIGS. 4 and 5. While a mechanical adjustment of the cylindrical adjustement extension 57 is shown in the Figures, it is contemplated that hydraulic or pneumatic means may be provided to automatically rotate adjustment extension 57 in sequence with the insertion operation to accommodate parts of varying lengths.

The forces and moments applied to insertion device 41 are essentially identical to those discussed above in connection with insertion device 11 of FIG. 1. Moreover, the reaction of insertion device 41 to such forces and moments may be described with reference to the behavior of insertion device 11 during an insertion operation. As mentioned above, sleeve 45 of insertion device 41 corresponds to bracket 21 of insertion device 11. Link elements 53 and 55 of FIGS. 4 and 5 correspond to links 15 and 13 of insertion device 11 respectively. At the initial one-point contact stage of the insertion operation, the lateral force urging pin 25 to the right (see FIG. 2) causes sleeve 45 to move laterally to the right. Pivots b and d will be laterally displaced by the same amount.

The lateral forces produced at points 39 on chamfer 40 and 36 on the sidewall of bore 35 during the two-point contact stage of the insertion operation, rotate pin 25 in a clockwise direction about a point therebetween. If that point of rotation corresponds to the center of compliance 32 of insertion device 41, pivots b and d displace laterally to the left with the displacement of pivot b being greater than that of pivot d to allow pin 25 to continue into bore 35. Where the point of rotation is offset from the center of compliance 32, the movement of sleeve 45 and pivots b and d may be considered as being the combination of a clockwise rotation about the center of compliance 32 and a translation laterally to the left. In either case, insertion device 41 accommodates the lateral forces produced during the two-point contact stage of the insertion operation to permit continued movement of pin 25 into bore 35 of mating part 37.

The vertical forces produced during the insertion operation, which are components of the frictional contact between pin 25 and points 39 and 36, are carried by insertion device 41 in the following manner. The chuck 23 transmits vertical forces to sleeve 45 which in turn are applied to pivot d. From pivot d, such forces are transmitted through link element 53 to the bearing sects 49 and collar 47 of pivot e and then to machine foundation 43.

Figure 6:
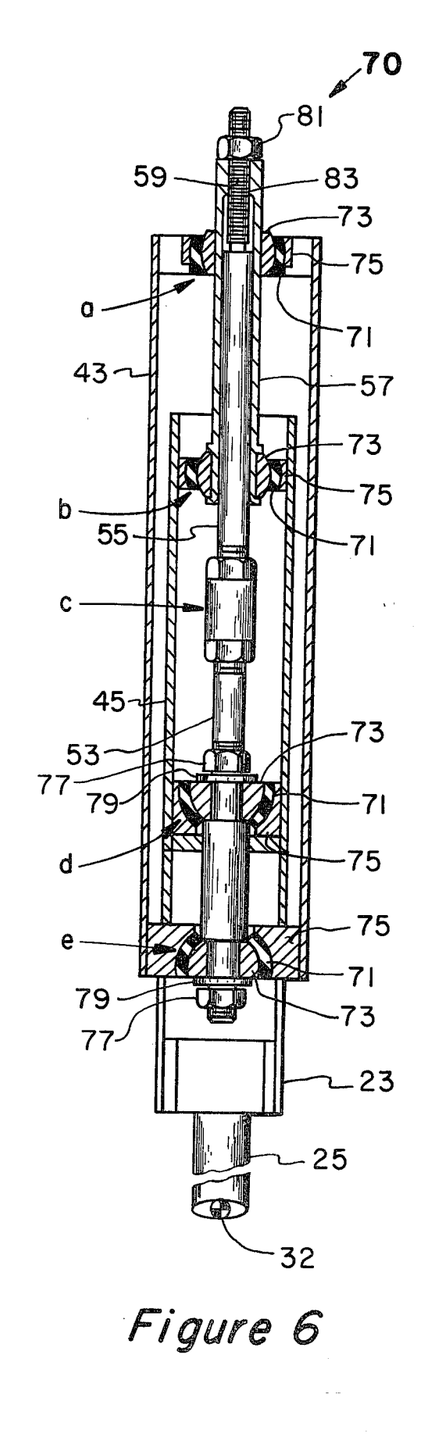
FIG. 6 is a front view in partial cross section of an alternate embodiment of the subject invention.

Referring now to FIG. 6, an insertion device labelled generally with the reference 70 is shown. Insertion device 70 is similar to insertion device 41 except that insertion 70 incorporates elastomeric pivots a, b, d and e which introduce a finite compliance throughout the system. Each of the elastomeric pivots a, b, d and e includes an elastomeric section 71 disposed between and attaching to an inner member 73 and outer member 75 of the bearing. The outer member 75 of pivot e is bonded or otherwise secured to the base of machine foundation 43, and its inner member 73 is held in place by means of a washer 77 and nut 79. Pivot d is attached in a similar manner to the base of sleeve 45.

The center of compliance 32 of insertion device 70 is adjusted in a manner similar to that for insertion device 41 with a slight variation. The adjustment extension 57 attached to pivot b extends upwardly concentric with link element 55 and into engagement with a nut 81 which is disposed along an upper threaded portion 83 of link element 55 above pivot a. Rotation of nut 81 causes pilot b to slide upwardly and downwardly along the inner surface of sleeve 45, which changes the distance between pivot b and compliance c with the attendant change in the location of center of compliance 32 as discussed above. It is contemplated that the means of adjusting the center of compliance 32 in insertion devices 41 and 70 may be interchanged with one another depending on space considerations and other design factors associated with a particular application.

The physical response of insertion device 70 to the forces and moments applied in an insertion operation is similar to that of insertion device 41. However, with the addition of a compliance characteristic at each of the pivots in insertion device 70, the effect of compliance c on the overall system compliance as compared to insertion device 41 is reduced. In fact, in some applications it is contemplated that satisfactory performance can be obtained with the elimination of compliance c. It can be appreciated that the characteristics of insertion device 70 may be widely varied by altering the compliance characteristics of the pivots a, b, d and e and of compliance c, to obtain the desired performance and the most economical design in a large number of applications.

Figure 7:
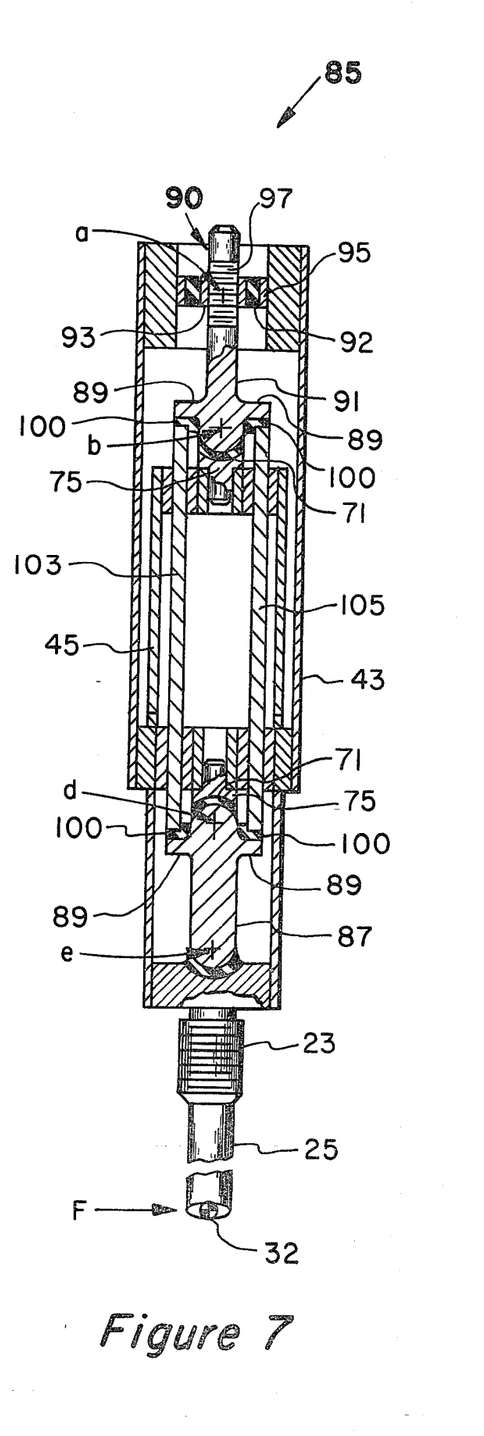
FIG. 7 is a front view in partial cross section of still another embodiment of the subject invention.

A still further embodiment of the insertion device of the subject invention is shown in FIG. 7 and labelled generally with the reference 85. Insertion device 85 embodies the fundamental relationship between pivot points to project the center of compliance 32 as contained in insertion devices 11, 41 and 70, but the coupling arrangement between pivot points is quite different. As in the embodiments of FIGS. 4–6, a sleeve 45 is concentrically disposed within machine foundation 43 and extends downwardly from the base thereof. A chuck 23 is attached to the base of sleeve 45 which is operable to hold pin 25 during the insertion operation. A spherical pivoting action similar to that described above in connection with insertion device 70 is provided at pivots a, b, d and e along the length of insertion device 85. Unlike the embodiments of the subject invention described above, however, no compliance c is provided in insertion device 85. Where links 13 and 15 of insertion device 11 are coupled together through compliance c as shown in FIG. 1, coupling is accomplished in insertion device 85 by different means as discussed below.

A lower link element 87 having outwardly extending shoulders 89 at its upper end is connected between pivots d and e. Pivot d includes a spherical elastomeric spherical bearing similar to that described above in connection with insertion device 70, which is attached to the base of machine foundation 43. Similarly, pivot e includes a elastomeric spherical bearing which is mounted to the base of sleeve 45. An upper link element 91 having outwardly extending shoulders 89 formed at its lower end is connected between pivots a and b. Pivot a is disposed at the top of machine foundation 43 and is formed in the configuration of an elastomeric tubeform 90 which includes an annular body of elastomer 92 disposed between and attaching to an inner sleeve 93 and an outer sleeve 95. The elastomeric tubeform 90 of appropriate proportions will behave similarly to a spherical elastomeric bearing. Outer sleeve 95 slideably engages the inner surface of machine foundation 43, while the inner sleeve 93 is threaded to engage a correspondingly threaded portion 97 of upper link element 91.

The location of the center of compliance 32 of insertion device 85 may be varied, as in the above embodiments of the subject invention, by changing the vertical distance between pivots a and b. This is accomplished in insertion device 85 by rotating tubeform 90 so that the threads of inner sleeve 93 move vertically upwardly and downwardly along the threaded portion 97 of upper link element 91. The attendant changes in the location of the center of compliance 32 with a change in the distance between pivot a and pivot b have been noted above.

As mentioned above, the compliance c is eliminated in insertion device 85 and replaced by alternate means of coupling upper and lower link elements 87 and 91. An elastomer layer 100 is attached to the shoulders 89 of upper and lower plates 87 and 91 by vulcanization, adhesive coatings or any other suitable means. As shown in FIG. 7, the shoulders 89 extend laterally outwardly on each side of upper and lower link elements 87 and 91 and the shoulders 89 on either side of upper link element 87 align with those formed on opposite sides of lower link element 91. A first push rod 103 extends between the facing shoulders 89 on one side of upper and lower link elements 87 and 91, and attaches to the elastomer layer 100 bonded thereto. Similarly, a second push rod 105 is disposed between the facing shoulders 89 on the other side of upper and lower link elements 87 and 91, and is also attached to the elastomer layer 100 bonded thereto. Although not shown in the Figures an additional shoulder 89 may be formed on upper and lower link elements 87 and 91, spaced at a 120° interval from the other two shoulders 89, to accommodate a third push rod (also not shown).

The operation of insertion device 85 in response to the forces and moments produced during insertion of pin 25 into the bore 35 of mating part 37, is governed by the action of push rods 103 and 105. With the application of a force F on pin 25 at the center of compliance 32, lower link element 87 rotates about pivot d and pivot e moves laterally to the right. Due to the connection between pivot e and sleeve 45, the lower portion of sleeve 45 also moves to the right with pivot e. As pivot e moves to the right, push rod 105 is deflected upwardly and push rod 103 is pulled downwardly. The movements of push rods 103 and 105 are imparted to upper link element 91 at shoulders 89 causing it to rotate about pivot b thus placing elastomer layer 71 in shear. Such rotation drives the lower end of the upper link element 91 laterally to the right relative to pivot a, and since pivot b is connected to sleeve 45, the upper portion of sleeve 45 also moves to the right. At this point, both the upper and lower portions of sleeve 45 have been driven to the right by force F to accommodate further insertion of pin 25 into mating part 37.

During the two-point contact stage of the insertion operation discussed above, the resultant lateral force applied to insertion device 85 of opposite to force F. In response to such force, the deflections of pivots e and b and the action of push rods 103 and 105 will be essentially opposite to that described above for force F, thus allowing pin 25 to rotate in the clockwise direction and translate to the left (see FIG. 3) for further advancement into the bore 35 of mating part 37.

In some applications such as inserting and driving a machine screw into a threaded bore, insertion devices 41, 70 and 85 will be required to carry torque loads. The insertion device 41 shown in FIGS. 4 and 5 would have to be altered slightly to accommodate torque loads, but such a modification could be limited to replacing the spherical bearings at pivots d and e with double pin universal joints. Both of the insertion devices 70 and 85 are capable of accommodating torque as they are shown in FIGS. 6 and 7.

While the invention has been described with reference to a preferred embodiment, it will be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode for carrying out this invention, but that the invention will include all embodiments falling within the scope of the appended claims.

What is claimed is:

1. In an assembly machine operable to move a first mating part into engagement with a second mating part for assembly thereof, the improvement comprising an insertion compliance device for accommodating misalignment between said mating parts including:

a first pivot means mounted to said assembly machine;

a second pivot means mounted to said assembly machine at a spaced interval from said first pivot means;

compliance means disposed between said first pivot means and said second pivot means;

a first link element pivotally attached to said first pivot means adjacent one end, and fixed to said compliance means at the other end;

a second link element pivotally attached to said second pivot means adjacent one end, and fixed to said compliance means at the other end;

third pivot means mounted along said first link element between said first pivot means and said compliance means;

fourth pivot means mounted along said second link element between said second pivot means and said compliance means;

a third link element pivotally mounted to said third pivot means and said fourth pivot means, said third link element including holding means operable to hold said first mating part during said assembly operation;

at least one of said pivot means including adjustment means, said adjustment means being operable to translate said at least one of said pivot means relative to the other pivot means for varying the location of the center of compliance of said insertion compliance device, whereby first mating parts of various lengths may be inserted within corresponding second mating parts with minimal wedging, jamming and reduced insertion loads.

2. The insertion compliance device of claim 1 wherein said compliance means is a plurality of alternating layers of elastomeric material and rigid material bonded together.

3. The insertion compliance device of claim 1 wherein each of said pivot means is a spherical bearing.

4. The insertion compliance device of claim 3 wherein said spherical bearing includes a collar, bearing seats and a bearing ball.

5. The insertion compliance device of claim 3 wherein said spherical bearing includes a layer of elastomeric material disposed between and attaching to an inner member and an outer member.

6. The insertion compliance device of claim 1 wherein said adjustment means includes extension means connected to said third pivot means, said extension means being disposed concentric with and extending along the outer surface of said first link element, said extension means having an inner threaded portion engageable with an outer threaded portion formed along said first link element, said third pivot means being moveable with said extension means along said first link element upon rotation of said extension means thereby varying the distance between said first pivot means and said third pivot means, said variation in distance between said first and third pivot means resulting in a corresponding variation in the location of the center of compliance of said insertion compliance device for accommodating first mating parts of differing lengths.

7. The insertion compliance device of claim 1 wherein said adjustment means includes extension means connected to said third pivot means, said extension means being disposed concentric with and extending along the outer surface of said first link element, said extension means having an inner threaded portion engageable with an outer threaded portion formed along said first link element, said third pivot means being moveable with said extension means along said first link element upon rotation of said extension means thereby varying the distance between said first pivot means and said third pivot means, the distance of said center of compliance relative to said insertion compliance device being increased by increasing the distance between said first and third pivot means, and the distance of said center of compliance relative to said insertion compliance device being reduced by reducing the distance between said first and third pivot means where said first and second link elements are equal in length.

8. In an assembly machine operable to move a first mating part into engagement with a second mating part for assembly thereof, the improvement comprising an insertion compliance device for accommodating misalignment between said mating parts including:

a first spherical pivot means mounted to said assembly machine;

a second spherical pivot means mounted to said assembly machine at a spaced interval from said first pivot means;

compliance means disposed between said first spherical pivot means and said second spherical pivot means;

a first link element pivotaly attached to said first spherical pivot means adjacent one end, and fixed to said compliance means at the other end;

a second link element pivotally attached to said second spherical pivot means adjacent one end, and fixed to said compliance means at the other end;

third spherical pivot means mounted along said first link element between said first spherical pivot means and said compliance means;

fourth spherical pivot means mounted along said second link element between said second spherical pivot means and said compliance means;

a third link element pivotally mounted to said third spherical pivot means and said fourth spherical pivot means, said third link element including holding means operable to hold said first mating part during said assembly operation;

at least one of said spherical pivot means including adjustment means, said adjustment means being operable to translate said at least one of said spherical pivot means relative to the other spherical pivot means for varying the location of the center of compliance of said insertion compliance device to a point near the insertion end of said first mating part, whereby first mating parts of various lengths may be inserted within corresponding second mating parts by operation of said adjustment means with minimal wedging, jamming and reduced insertion loads.

9. The insertion compliance device of claim 8 wherein said compliance means is a plurality of alternating layers of elastomeric material and rigid material bonded together.

10. The insertion compliance device of claim 8 wherein said spherical bearing includes a collar, bearing seats and a bearing ball.

11. The insertion compliance device of claim 8 wherein said spherical bearing includes a layer of elastomeric material disposed between and attaching to an inner member and an outer member.

12. The insertion compliance device of claim 8 wherein said adjustment means includes extension means connected to said third spherical pivot means, said extension means being disposed concentric with and extending along the outer surface of said first link element, said extension means having an inner threaded portion engageable with an outer threaded portion formed along said first link element, said third spherical pivot means being moveable with said extension means along said first link element upon rotation of said extension means thereby varying the distance between said first spherical pivot means and said third spherical pivot means, said variation in distance between said first and third spherical pivot means resulting in a corresponding variation in the location of the center of compliance of said insertion compliance device for accommodating first mating parts of differing lengths.

13. The insertion compliance device of claim 8 wherein said adjustment means includes extension means connected to said third spherical pivot means, said extension means being disposed concentric with and extending along the outer surface of said first link element, said extension means having an inner threaded portion engageable with an outer threaded portion formed along said first link element, said third spherical pivot means being moveable with said extension means along said first link element upon rotation of said extension means thereby varying the distance between said first spherical pivot means and said third spherical pivot means, the distance of said center of compliance relative to said insertion compliance device being increased by increasing the distance between said first and third spherical pivot means, and the distance of said center of compliance relative to said insertion compliance device being reduced by reducing the distance between said first and third spherical pivot means where said first and second link elements are equal in length.

14. In an assembly machine operable to move a first mating part into engagement with a second mating part for assembly thereof, the improvement comprising an insertion compliance device for accommodating misalignment between said mating parts including:
   a first pivot means mounted to said assembly machine;
   a second pivot means mounted to said assembly machine at a spaced interval from said first pivot means;
   a first link element pivotally mounted adjacent one end to said first pivot means, said first link element being formed with at least two bearing surfaces at the other end thereof, said bearing surfaces having a layer of elastomeric material attaching thereto;
   a second link element pivotally mounted adjacent one end to said second pivot means, said second link element being formed with at least two bearing surfaces at said one end thereof corresponding to and aligning with said at least two bearing surfaces of said first link element, said bearing surfaces having a layer of elastomeric material attaching thereto;
   a third pivot means mounted adjacent said bearing surfaces at said one end of said first link element;
   a fourth pivot means mounted adjacent the other end of said second link element;
   a third link element pivotally mounted to said third pivot means and said fourth pivot means, said third link element including holding means operable to hold said first mating part during said assembly operation;
   at least two push rod means extending between respective ones of said bearing surfaces of said first and second link elements, said at least two push rod means attaching to said elastomer layer of each of said at least two bearing surfaces and being moveable therewith, said at least two push rod means acting to couple said first link element to said second link element for transmitting motion therebetween;
   at least one of said pivot means having adjustment means, said adjustment means being operable to translate said at least one of said pivot means relative to the other pivot means for varying the location of the center of compliance of said insertion compliance device to a point at or near the insertion end of said first mating part, whereby first mating parts of various lengths may be inserted within corresponding second mating parts by operation of said adjustment means with minimal wedging, jamming and reduced insertion loads.

15. The insertion compliance device of claim 14 wherein at least one of said pivot means is an elastomeric tube form including an annular layer of elastomeric material disposed between and attaching to an inner sleeve and an outer sleeve, and the remaining pivot means are spherical elastomeric bearings.

16. The insertion compliance device of claim 14 wherein said adjustment means is formed as a portion of said first pivot means, said first pivot means including an annular layer of elastomeric material disposed between and attaching to an inner sleeve and an outer sleeve, said inner sleeve having a threaded portion forming said adjustment means, said threaded portion of said inner sleeve being engageable with a correspondingly threaded portion formed along said first link element, said first pivot means being moveable along said threaded portion of said first link element by rotation thereof, said rotation of said first pivot means varying the distance between said first and third pivot means resulting in a corresponding variation in the location of the center of compliance of said insertion compliance device for accommodating first mating parts of different lengths.

* * * * *